United States Patent [19]

Dockal

[11] 4,239,352
[45] Dec. 16, 1980

[54] HEAD-SUPPORTED OPTIC SHIELD

[76] Inventor: E. J. Dockal, 8606 Kellett La., Houston, Tex. 77028

[21] Appl. No.: 59,257

[22] Filed: Jul. 20, 1979

[51] Int. Cl.³ .............................................. G02C 7/08
[52] U.S. Cl. ......................................... 351/57; 2/10
[58] Field of Search ............... 2/353, 318 L, 185 RC, 2/185 BC, 195, 15, 10, 427 C, 447 C, 11; 351/44, 45, 57, 168, 54, 189; 350/183

[56] References Cited

U.S. PATENT DOCUMENTS

| | | | |
|---|---|---|---|
| 1,008,109 | 11/1911 | Bickerton | 2/10 |
| 1,212,842 | 1/1917 | Stronge | 2/10 |
| 1,222,995 | 4/1917 | Rhoades | 2/10 |
| 1,342,277 | 6/1920 | Dowd | 2/10 |
| 2,155,258 | 4/1939 | Dennis | 2/11 |
| 2,362,637 | 11/1944 | Keehn | 351/44 |
| 2,576,581 | 11/1951 | Edwards | 351/168 |
| 2,728,913 | 1/1956 | Connor | 2/10 |
| 4,138,746 | 2/1979 | Bergmann | 2/10 |

Primary Examiner—John K. Corbin
Assistant Examiner—B. W. de los Reyes
Attorney, Agent, or Firm—Neal J. Mosely

[57] ABSTRACT

A head-supported optic shield protects the eyes of the wearer and eliminates the need to wear glasses while working. The optic shield comprises a porous, ventilated cap having an annular supporting member or brim and an adjustable chin strap. The supporting member or brim includes an outwardly extending peripheral flange which cooperated with and supports the supporting flange portion of a cylindrical shield. The cylindrical shield is of clear, transparent safety glass or optical quality plastic with three lens portions, viz. clear, close magnification, and distance magnification. The supporting flange on the optical shield has a notch which cooperates with a positioning abutment on the brim so that the cylindrical shield may be rotated and temporarily fixed in a predetermined position with any one of the lenses in front of the eyes of the wearer. An auxiliary welding shield is provided.

8 Claims, 4 Drawing Figures

HEAD-SUPPORTED OPTIC SHIELD

BACKGROUND OF THE INVENTION

1. Field of the Invention

This invention relates to new and useful improvements in head-supported optic devices and, more particularly, a multi-lens optic shield supported on a hat or a cap.

2. Brief Description of the Prior Art

In the prior art, the use of protective goggles and protective face masks, with or without optical lenses, is known. The use of individual face shields and individual glasses and lenses under severe working conditions has been inconvenient and there has been a need for some device or mechanism to provide both an optical shield and suitable lenses for use under working conditions.

Dowd, U.S. Pat. No. 1,342,277, discloses a porous, head-supported band with a cap carried thereon and protective mesh for protection against mosquitoes and insects. The protective shield has no optical capacity.

Dennis, U.S. Pat. No. 2,155,258, discloses a hat or cap with an adjustable support for goggles thereon.

Conner, U.S. Pat. No. 2,728,913, discloses a safety hat with a fine mesh screen carried on the brim for protecting the eyes of the wearer. This device has no optical capacity.

OBJECTS OF THE INVENTION

One of the objects of this invention is to provide eye protection for workers while eliminating the need to wear glasses.

Another object of this invention is to provide a head-supported device supporting a rotatable optical shield having variable lenses.

Still another object of this invention is to provide an improved cap or hat supporting a cylindrical eye and face shield having distinct lenses for different fields of view.

A further object is to provide an improved cap or hat having supported thereon a cylindrical, rotatable eye and face mask or shield with several distinct lenses for use under different conditions and rotatable to bring selected lenses into the field of view.

Other objects of this invention will become apparent from time to time throughout the specification and claims as hereinafter related.

SUMMARY OF THE INVENTION

The aforementioned objects and other objects are attained by a novel head-supported optic shield manufactured and worn or used by this invention. A head-supported optic shield protects the eyes of the wearer and eliminates the need to wear glasses while working. The optic shield comprises a porous, ventilated cap having an annular supporting member or brim and an adjustable chin strap. The supporting member or brim includes an outwardly extending peripheral flange which cooperated with and supports the supporting flange portion of a cylindrical shield. The cylindrical shield is of clear, transparent safety glass or optical quality plastic with three lens portions, via., clear, close magnification, and distance magnification. The supporting flange on the optical shield has a notch which cooperates with a positioning abutment on the brim so that the cylindrical shield may be rotated and temporarily fixed in a predetermined position with any one of the lenses in front of the eyes of the wearer. An auxiliary welding shield is provided.

DESCRIPTION OF THE PREFERRED EMBODIMENT

Figure 1:
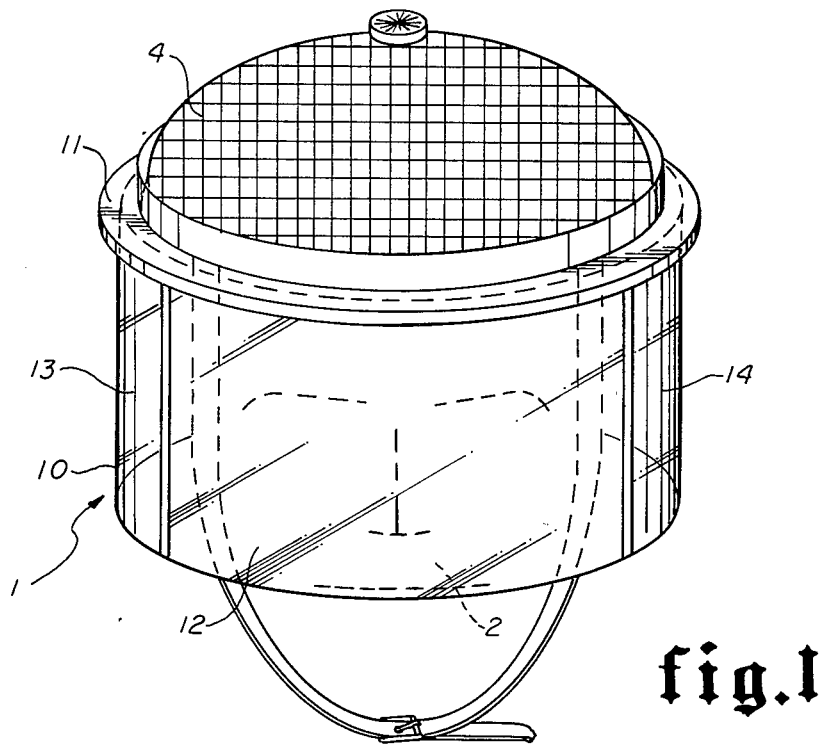
FIG. 1 is an isometric view of a preferred embodiment of this invention showing a head-supported optic shield on the head of a wearer or user.
Figure 2:
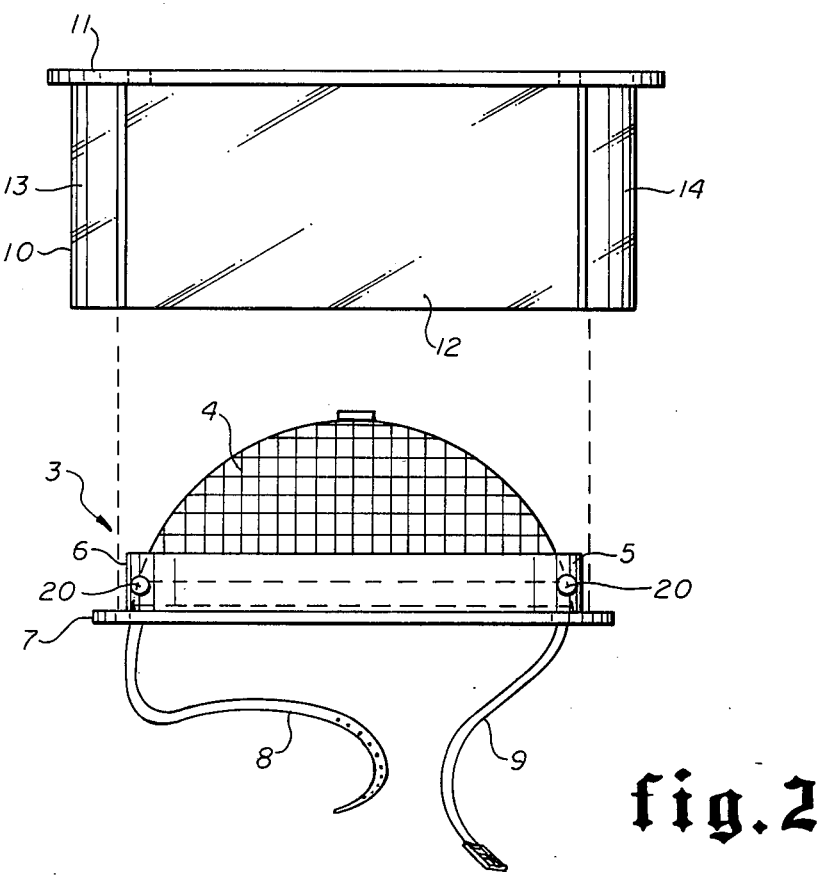
FIG. 2 is an exploded view, in side elevation, of the head-supported optic shield shown in FIG. 1.

In the drawing, and particularly, in FIG. 1, there is shown a head-supported optic shield 1 supported on the head 2 of a wearer or user.

The head-supported optic shield 1 comprises a cap 3 having a porous or ventilated cap portion 4 secured on a brim of annular supporting member 5. The brim 5 has a tubular upstanding portion 6 and an outwardly extending peripheral flange 7. Chin straps 8 and 9 are secured to brim 5 for securing the device on the head of the user or wearer.

Head-supported optic shield 1 includes a cylindrical, preferably one piece, shield 10 having an upper supporting flange 11 which is supported for rotary movement on flange 7 of the brim or annular supporting member 5. Cylindrical shield 10 is constructed of an optically clear, transparent material and may be of safety glass or optical quality, clear, transparent plastic. Cylindrical shield 10 is divided into three distinct portions 12, 13 and 14. Portion 12 is of clear glass or plastic of cylindrical shape (constituting approximately ⅓ of a cylinder) and is free of optical distortion. The portion 13 of optical shield 10 is a cylindrical lens (extending for approximately ⅓ of the cylinder) having a focus providing magnification of distant objects. The portion 14 of optical shield 10 is a cylindrically curved lens (extending for approximately ⅓ of the cylinder) and having a focus for magnification of near objects. If desired, the lenses 13 and 14 may be made to the optical specifications for near and far vision of the particular user or wearer according to the prescription of his optometrist or ophthalmologist. In many cases, however, the lenses 13 and 14 function merely to provide magnification of close objects, or of distant objects for use in the field of work of the wearer or the user. The plastic or glass in optic shield 10 may be completely clear and uncolored, or may be tinted or colored as may be required for the field of work of the wearer or user.

Figure 3:
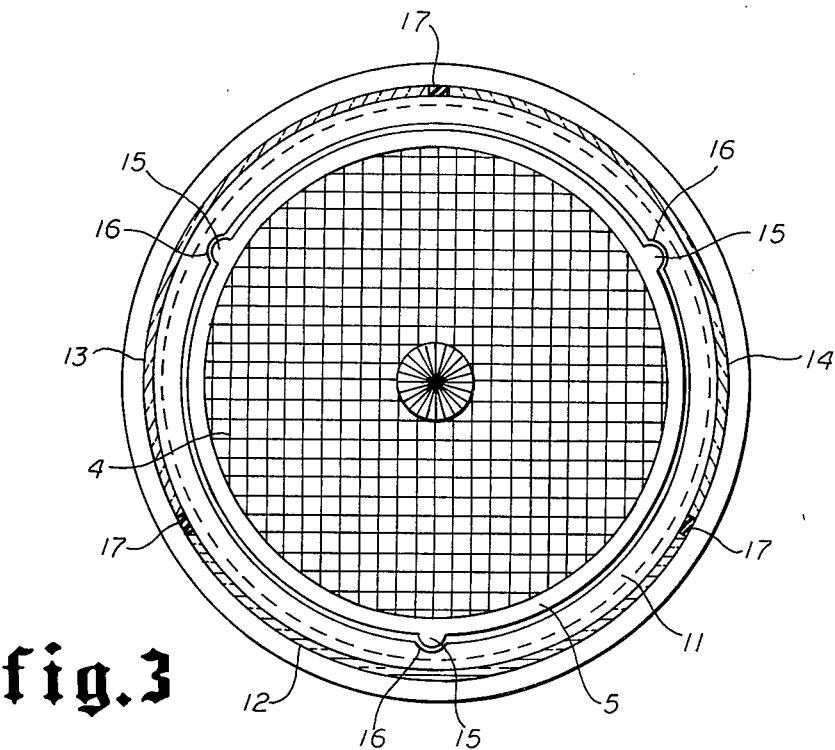
FIG. 3 is a top plan view of the head-supported optic shield shown in FIGS. 1 and 2.

In FIG. 3, it is seen that tubular portion 5 of brim or supporting member 6 has one or more abutments or keys 15 spaced equal distances apart around the periphery thereof and fitting corresponding notches 16 in supporting flange 11. The cooperating notches 16 and abutments 15 function to locate optic shield 10 with a particular lens portion properly positioned in front of the eyes of the user or wearer.

The apparatus thus far described has been considered as having a one-piece cylindrical lens shield 10. Optionally, the separate lenses 12, 13 and 14 may be formed separately and secured on supporting flange 11. This optional construction is seen in FIG. 3 wherein the lenses are separated at 17.

Figure 4:
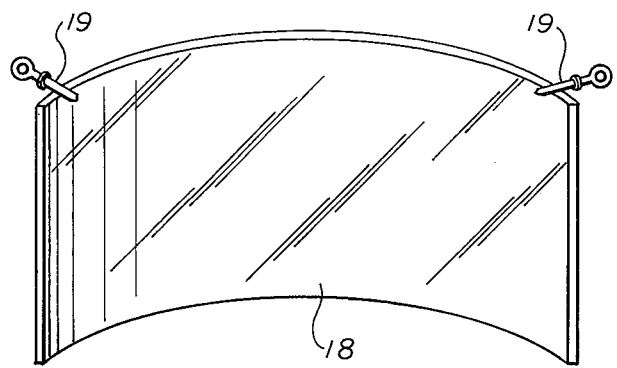
FIG. 4 is an isometric view of an optional welding shield usable with the head-supported optic shield of FIGS. 1-3.

In FIG. 4, there is shown a cylindrical shield member 18 which is transparent but of a very dark color to protect the eyes of the wearer. This is a conventional welder's mask and is of cylindrical shape and provided with retaining pins 19 which can be fitted into holes 20 in the upstanding cylindrical portion of the brim or supporting member 5. This welding shield can be supported on the cap or hat over the optic shield 10 and the wearer can still have the advantage of either the clear, unmagnified portion 12 or of the close magnification provided by the portion 14.

The operation and use of this apparatus is quite clear from the foregoing description. It should be noted that the ventilated cap 4 provides the wearer or user freedom to work under sweating conditions. The shield arrangement eliminates the need to wear glasses while working and provides eye protection and magnification or prescription optical correction for the eyes of the wearer or user. As previously noted, this equipment can be of clear glass or plastic or may be tinted or colored to any suitable color required in the field of work or the user or wearer and includes, optionally, an additional welder's mask for protection of the wearer's eyes in addition to providing the desired lens correction or magnification.

While this invention has been described fully and completely with special emphasis upon a single preferred embodiment, it should be understood that within the scope of the appended claims the invention may be practiced otherwise than as specifically described herein.

I claim:

1. A head-supported optic shield comprising
   an annular supporting member adapted to be worn on the head of the user,
   a continuous cylindrical shield supported on said annular supporting member, surrounding the head of the wearer and extending from above to substantially below the level of the eyes of the wearer,
   said cylindrical shield being constructed of an optically clear material, substantially all of which comprises optical lens material of differing optical focus,
   means supporting said shield for rotary movement between fixed positions on said supporting member, and
   said cylindrical shield being rotatable about the head of the wearer while being worn between fixed positions of different optical focus.

2. A head-supported optic shield according to claim 1 in which
   said cylindrical shield is of safety glass or optical quality clear transparent plastic,
   said cylindrical shield has separate portions of different optical focus, and
   said supporting member includes means to support said cylindrical shield in a temporarily fixed position with one of said portions of different optical focus directly in front of the eyes of the wearer.

3. A head-supported optic shield according to claim 1 or 2 in which
   said annular supporting member includes a head covering comprising a cap,
   said annular supporting member having a peripheral flange,
   said cylindrical shield having a peripheral flange fitting and supported for rotary movement on said supporting member peripheral flange.

4. A head-supported optic shield according to claim 2 in which
   said annular supporting member has a peripheral flange and at least one positioning abutment, and
   said cylindrical shield has a peripheral flange fitting and supported on said supporting member peripheral flange and a positioning notch cooperable with said positioning abutment to locate said shield in one of a plurality of predetermined positions.

5. A head-supported optic shield according to claim 4 in which
   said annular supporting member includes a head covering comprising a cap, and
   a strap adapted to be secured below the wearer's chin to secure said cap, supporting member and optic shield in position on the wearer's head.

6. A head-supported optic shield according to claim 1 or claim 2 or claim 4 or claim 5 in which
   said cylindrical shield has at least three separate portions of different optical focus,
   one of said portions being clear and without magnification,
   another of said portions being a lens of cylindrical curvature having a focus for magnifying distant objects, and
   another of said portions being a lens of cylindrical curvature having a focus for magnification of close objects.

7. A head-supported optic shield according to claim 1 or 2 in which
   said cylindrical shield is tinted or colored.

8. A head-supported optic shield according to claim 1 or 2 including additionally
   a dark colored transparent welder's protective lens supported on said supporting member separately from said cylindrical shield.

* * * * *